US008526046B2

(12) United States Patent
Uchida

(10) Patent No.: US 8,526,046 B2
(45) Date of Patent: Sep. 3, 2013

(54) IMAGE FORMING APPARATUS, CONTROL METHOD FOR IMAGE FORMING APPARATUS, AND PROGRAM THEREOF

(75) Inventor: Tatsuro Uchida, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 9 days.

(21) Appl. No.: 13/394,527

(22) PCT Filed: Jan. 23, 2012

(86) PCT No.: PCT/JP2012/000368
§ 371 (c)(1),
(2), (4) Date: Mar. 6, 2012

(87) PCT Pub. No.: WO2012/108133
PCT Pub. Date: Aug. 16, 2012

(65) Prior Publication Data

US 2012/0274979 A1 Nov. 1, 2012

(30) Foreign Application Priority Data

Feb. 8, 2011 (JP) ................................ 2011-025255

(51) Int. Cl.

| | |
|---|---|
| ***G06F 3/12*** | (2006.01) |
| ***G06F 15/16*** | (2006.01) |
| ***G06F 15/167*** | (2006.01) |
| ***G06F 15/173*** | (2006.01) |
| ***G06K 15/00*** | (2006.01) |

(52) U.S. Cl.
USPC ........ 358/1.15; 358/1.13; 358/1.16; 709/203; 709/209; 709/216; 709/219; 709/223; 709/229

(58) Field of Classification Search
None
See application file for complete search history.

(56) References Cited

U.S. PATENT DOCUMENTS

| | | | | |
|---|---|---|---|---|
| 2006/0265644 | A1 * | 11/2006 | Koizumi ........................ | 715/522 |
| 2007/0230463 | A1 * | 10/2007 | Shima et al. .................. | 370/389 |

FOREIGN PATENT DOCUMENTS

| | | | |
|---|---|---|---|
| JP | 2002-027194 | A | 1/2002 |
| JP | 2002-304271 | A | 10/2002 |
| JP | 2004-334751 | A | 11/2004 |
| JP | 2005-309617 | A | 11/2005 |
| JP | 2006-227927 | A | 8/2006 |
| JP | 2006-252406 | A | 9/2006 |

* cited by examiner

*Primary Examiner* — Benny Q Tieu
*Assistant Examiner* — Haris Sabah
(74) *Attorney, Agent, or Firm* — Canon USA, Inc., IP Division

(57) ABSTRACT

An image forming apparatus includes a reception unit and an execution unit. The reception unit receives a first parameter, which is to be transmitted responsive to a user issued request instruction sent to the apparatus and is described in a format that conforms to a first network protocol corresponding to the request. The execution unit, when the apparatus is compliant with the first network protocol, interprets the received first parameter and executes request processing based on a result of interpretation, and, when the apparatus is not compliant, adds the received first parameter to a second parameter which is described in a format per a second network protocol different from the first network protocol, transmits the second parameter to a server, receives a processing result from the server which has interpreted the first parameter based on the second parameter, and executes request processing based on the processing result.

7 Claims, 11 Drawing Sheets

IMAGE FORMING APPARATUS, CONTROL METHOD FOR IMAGE FORMING APPARATUS, AND PROGRAM THEREOF

CROSS REFERENCE TO RELATED APPLICATIONS

This application is a National Stage filing of PCT application No. PCT/JP2012/000368, filed Jan. 23, 2012, which claims priority from Japanese Patent Application No. 2011-025255, filed Feb. 8, 2011, all of which are hereby incorporated by reference herein in their entirety.

TECHNICAL FIELD

The present invention relates to an image forming apparatus capable of executing a processing request from a client, a control method for the image forming apparatus, and a program thereof.

BACKGROUND ART

There is a conventional technique allowing a user to input a print instruction via a personal digital assistant (PDA) to cause a printer to execute printing. A Patent Literature (PTL) 1 discusses a method for issuing a print instruction from the PDA to cause a printer to execute printing via an intermediation server.

In recent years, various types of printing systems via the Internet referred to as a cloud printing have existed. For example, there are U.S. Hewlett-Packard Company's HP ePrint™, U.S. Apple Computer Inc's AirPrint™, U.S. Google's™ Google Cloud Print™. Among them, a system in which PDA serving as a portable device directly communicates with a printer and causes the printer to execute printing is drawing a lot of attention. In an operating system (OS) of such a PDA, or a browser, a network protocol (communication protocols/communication procedures) for causing a printer to execute printing is mounted, and the above-described printing can be realized by communicating with the printer in accordance with the protocol.

CITATION LIST

Patent Literature

PTL 1: Japanese Patent Application Laid-Open No. 2002-304271

SUMMARY OF INVENTION

Technical Problem

Such a printing system can be realized only if each device vendor (printer manufacture) mounts functions corresponding to respective services or a network protocol on a program (e.g., firmware) of each image forming apparatus.

In a case where the device vendor responds to these printing systems, the device vendor needs to update the program of the printer each time a new printing system appears on the scene, and has to invest cost and time to respond to the systems. However, such a handling makes it difficult for the device vendor to quickly provide a printer having adequate functions at low price.

There is another issue that even a printer with the program updated as described above cannot easily comply with a new network protocol published after release for sale of the product. Although it is necessary for the printer to update the program in order to comply with the new network protocol, it becomes very troublesome work to update the program of printers sold in various areas.

Solution to Problem

According to an aspect of the present invention, an image forming apparatus includes a reception unit configured to receive a first parameter which is a parameter to be transmitted when a user issues an instruction of a request to the image forming apparatus via a client and is described in a format that conforms to a network protocol corresponding to the request, and an execution unit configured, if the image forming apparatus is compliant with the network protocol, to interpret the first parameter received by the reception unit and to execute request processing based on a result of interpretation, and if the image forming apparatus is not compliant with the network protocol, to add the first parameter received by the reception unit to a second parameter which is described in a format in accordance with a network protocol different from the network protocol, to transmit the second parameter to a server, to receive a processing result from the server which has interpreted the first parameter based on the second parameter, and to execute request processing based on the processing result.

According to the exemplary embodiment of the present invention, even a printer which is not compliant with a network protocol mounted on a client, it becomes possible to respond to a new printing system by utilizing a virtual printer on the Internet.

Further features and aspects of the present invention will become apparent from the following detailed description of exemplary embodiments with reference to the attached drawings.

BRIEF DESCRIPTION OF DRAWINGS

The accompanying drawings, which are incorporated in and constitute a part of the specification, illustrate exemplary embodiments, features, and aspects of the invention and, together with the description, serve to explain the principles of the invention.

DESCRIPTION OF EMBODIMENTS

Various exemplary embodiments, features, and aspects of the invention will be described in detail below with reference to the drawings.

The present invention relates to processing a client's request by a printer which is not compliant with a network protocol of a client. More specifically, the printer requests a virtual printer existing on the Internet to perform the processing, so that the client's request is realized by the virtual printer executing the processing.

Terminology used in each exemplary embodiment of the present invention will be described. The term "network protocol" refers to communication protocols and communication procedures. The term "device incompliant with a network protocol" refers to a device which does not mount a module for understanding the communication protocols and communication procedures. The device not mounting the module can receive a packet at a low level of a network layer, but cannot interpret contents of the packet at a high level of the network layer. A set of packets transmitted in response to a request made by a user to an image forming apparatus via a client is referred to as a request message. Though the details will be described below, the request message includes a header portion and a parameter portion.

System Configuration

Figure 1:
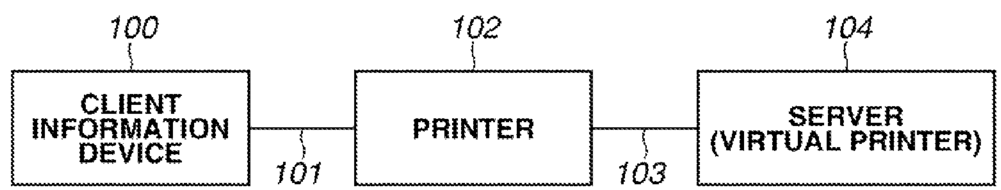
FIG. 1 is a block diagram illustrating a system configuration according to an exemplary embodiment of the present invention.

FIG. 1 is a block diagram illustrating an example of a system configuration according to an exemplary embodiment of the present invention. A printing system includes a client information device 100, a printer 102, and a server (virtual printer) 104. The client information device 100 and the printer 102 are connected via an appropriate connection medium 101, and are provided with a function of communicating with each other. The printer 102 and the server (virtual printer) 104 are also connected via an appropriate connection medium 103, and are provided with a function of communicating with each other.

The communication media 102 and 104 can take a connection configuration including local peer-to-peer connection such as a universal serial bus (USB) or a Bluetooth, network connection such as wired and wireless local area network (LAN), and the Internet connection, and there is no restrictions on the connection configuration.

If a wide range network such as the Internet is used for the connection medium 103, it becomes possible to apply the effects of the present invention to all the printers (102) accessible to the server (virtual printer) 104. Further, if the wide range network such as the Internet is used for the connection medium 101, it is also possible to apply the present invention to cloud printing that is a printing service utilizing Web server.

In a first exemplary embodiment, it is assumed that the printer 102 and the server 104 are apparatuses supplied by the same vendor, and the client information device 100 is supplied by a separate vendor different from the above-described vendor. Hence, when the printer 102 and the virtual printer 104 perform communication, the communication is determined to be performed in accordance with a predetermined network protocol. Thus, the printer 102 and the virtual printer 104 are also equipped with a communication module for this purpose. On the other hand, the client information device 100 and the printer 102 cannot necessarily communicate with each other. This is because two apparatuses are produced by the different vendors, and the printer 102 is not guaranteed to be compliant with the network protocol which the client information device 100 utilizes for communication.

Hardware Configuration

Figure 2:
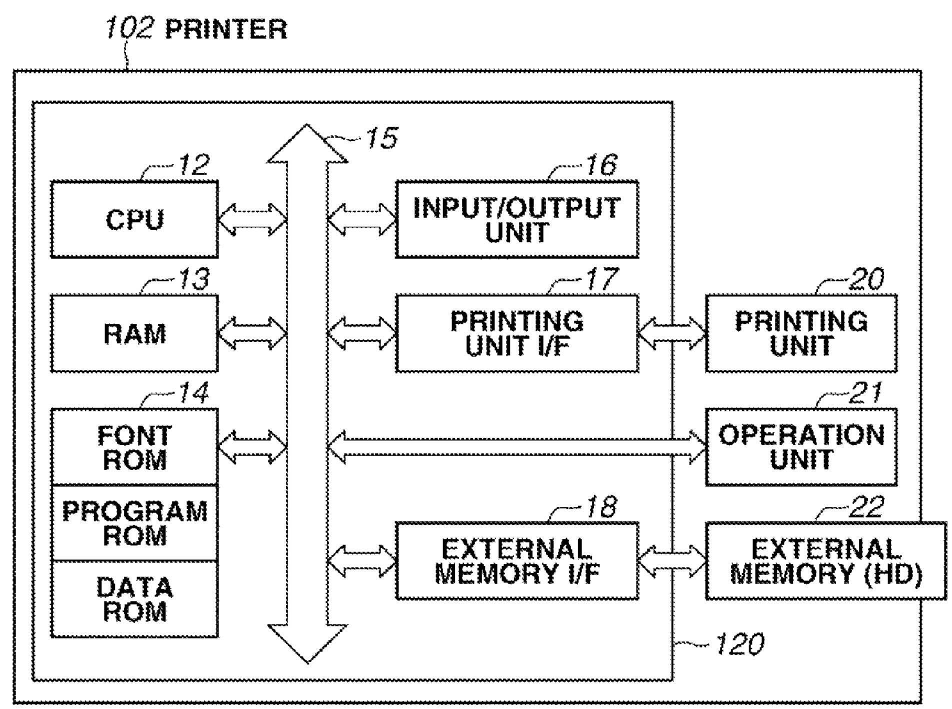
FIG. 2 is a block diagram illustrating a configuration of a printer.

FIG. 2 is a block diagram illustrating a configuration of the printer 102. The printer 102 is controlled by a central processing unit (CPU) 12. The CPU 12 can load a control program stored in a read-only memory (ROM) 14 and various types of programs stored in an external memory 22 to a random access memory (RAM) 13 and execute the programs. The CPU 12 converts printing data or the like input via an input/output unit 16 based on an operation of the control program into an image signal and outputs the image signal to a printing unit 20 thereby carrying out printing. Further, the CPU 12 performs processing with respect to various types of response requests input via the input/output unit 16 based on the operation of the control program, and outputs processing results thereof via the input/output unit 16. An operation unit 21 is connected to the printer 102, so that the printer 102 can directly receive an input from the user. Further, the printer 102 may mount thereon a scanner unit (not illustrated).

Figure 3:
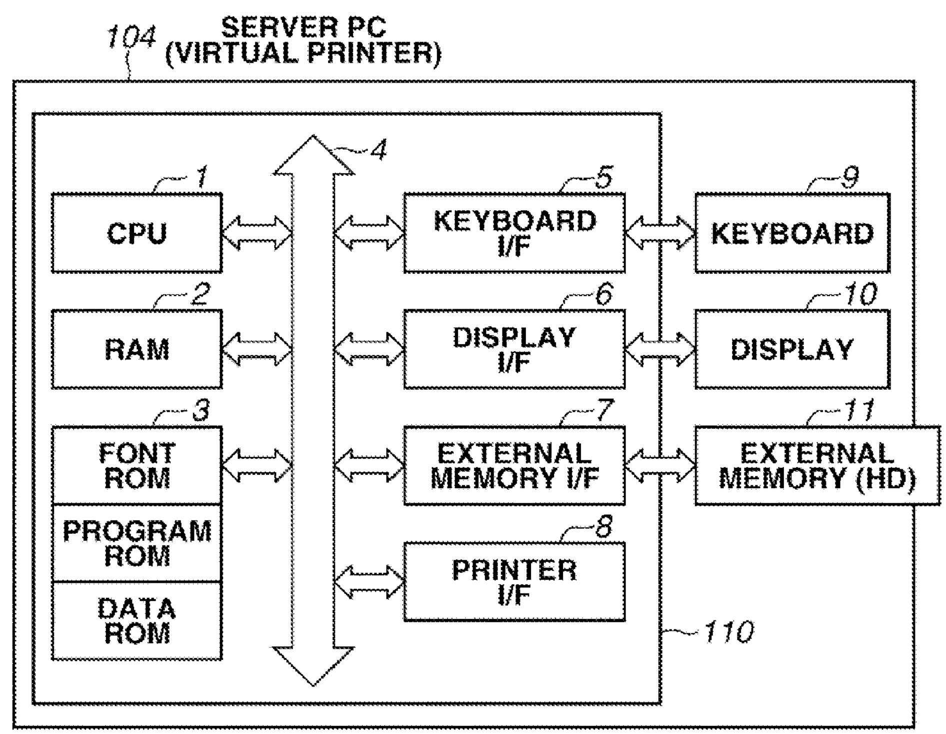
FIG. 3 is a block diagram illustrating a configuration of a virtual printer.

FIG. 3 is a block diagram illustrating a configuration of the server (virtual printer) 104. The server (virtual printer) 104 is controlled by a CPU 1. The CPU 1 can load a basic input/output system (BIOS control program) stored in a ROM 3 and an operating system and various types of application programs stored in an external memory 11 onto a RAM 2 and execute them. A keyboard 9 for receiving input from the user and a display 10 for displaying processing results for the user as an image are connected to the server (virtual printer) 104. Further, the server (virtual printer) 104 is provided with a printer interface (I/F) 8 for communicating with the printer 102. Hereinafter, the server (virtual printer) 104 is described as "the virtual printer" or "the virtual printer 104".

The client information device 100 may be an information device that can exchange information pieces concerning printing or various types of information acquisitions with the printer 102, and may have, for example, the hardware configuration illustrated in FIG. 3. A computer such as a personal computer, a server computer, or a portable information device such as a PDA, a mobile phone, or other devices may be used. Further, the client information device 100 may be an information device that receives a printing request from other information devices (not illustrated), and transfers the request to the printer (102). Hereinafter, the client information device 100 is described as "the client" or "the client 100".

Software Configuration

Figure 4:
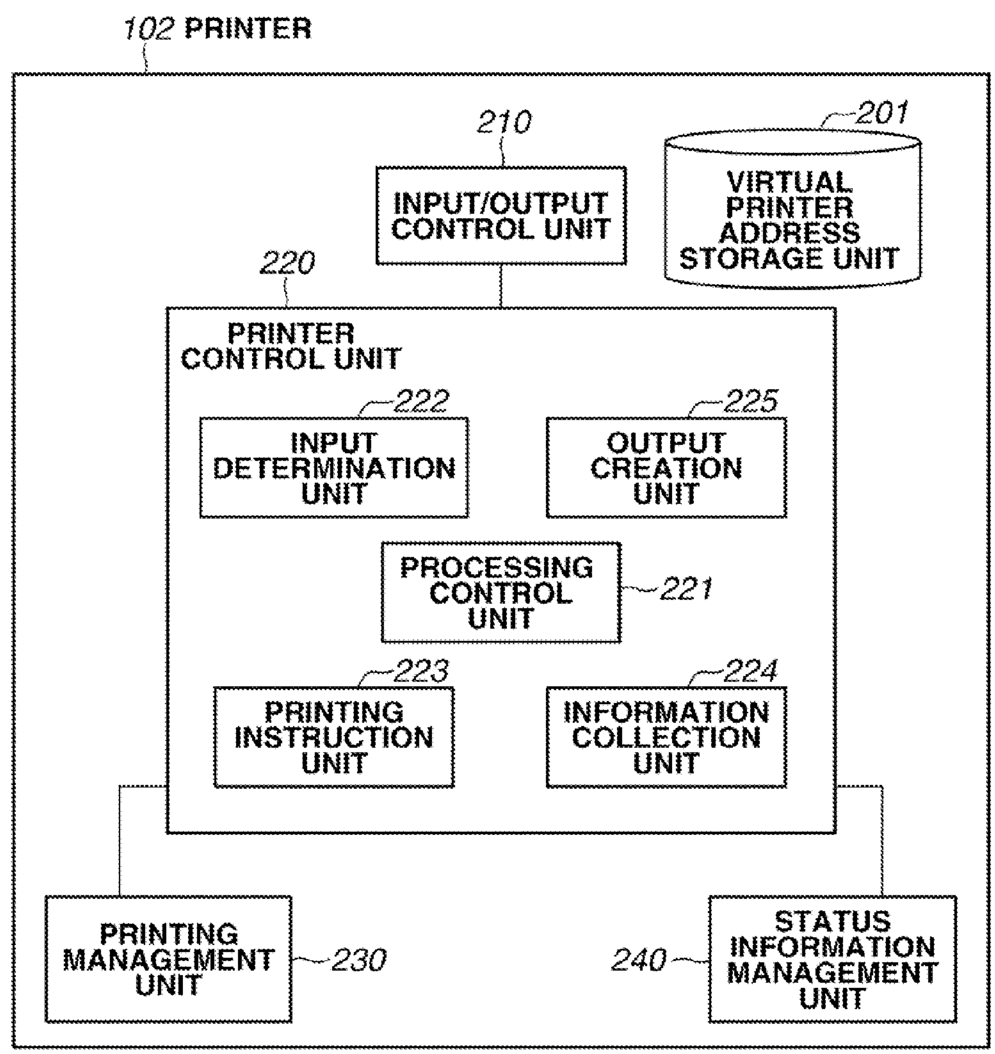
FIG. 4 is a block diagram illustrating a software configuration of the printer.

FIG. 4 is a block diagram illustrating a software configuration of the printer 102. The printer 102 includes the following components. These components may be realized by executing programs corresponding to these components.

An input/output control unit 210 performs processing to receive information from the outside as well as to output information to the outside. A printing management unit 230 manages processes such as instructing the printing unit 20 to perform print processing. A status information management unit 240 manages a state of the printer, and information concerning the printer. A printer control unit 220 receives information from the input/output control unit 210, the printing management unit 230, or the status information management unit 24 as well as outputs information or an instruction. A virtual printer address storage unit 201 stores address information of the virtual printer 104.

The printer control unit 220 includes the following functions. A processing control unit 221 is a controller that controls the printer control unit 220. An input determination unit 222 determines what type of information is input via the input/output control unit 210. A printing instruction unit 223 issues a print instruction to the printing management unit 230. An information collection unit 224 collects the state of the printer and information concerning the printer from the status information management unit 240.

The term "state of printer" refers to, for example, an error, a warning, a standby state, and an idling state. The term "information concerning printer" refers to, for example, a remaining paper amount, a remaining toner amount, a remaining ink amount, information about the installed application. An output creation unit 225 creates information to be output via the input/output control unit 210.

Figure 5:
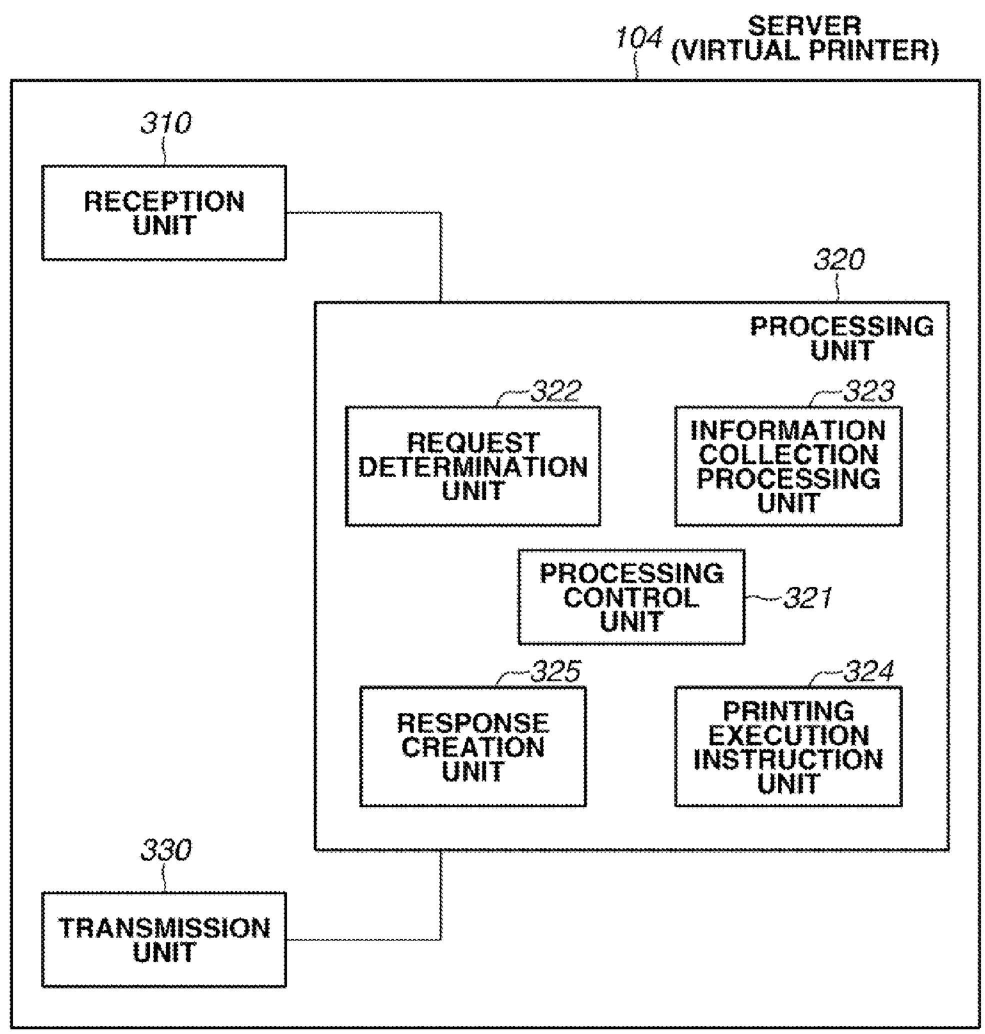
FIG. 5 is a block diagram illustrating a software configuration of the virtual printer.

FIG. 5 is a block diagram illustrating a software configuration of the virtual printer 104. The virtual printer 104 includes the following components. A reception unit 310 receives information from the outside. A transmission unit 330 transmits information to the outside. A processing unit 320 executes processing corresponding to the contents of the information received by the reception unit 310, and issues an instruction as necessary to the transmission unit 330.

The processing unit 320 includes the following functions. A processing control unit 321 is a controller that controls the processing unit 320. A request determination unit 322 determines what type of information is the information received via the reception unit 310. An information collection processing unit 323 collects information of the virtual printer and information provided from the printer. A printing execution instruction unit 324 requests the printer 102 to execute printing. A response creation unit 325 creates information to be transmitted to the client 100 via the transmission unit 330.

The client 100 includes a control unit (not illustrated) and a browser (not illustrated). The control unit is realized by executing an operating system (OS) program, and the browser is realized by executing a browser program. A user interface (UI) provided by the control unit includes a button for instructing a device search request. Further, the UI displayed by the browser includes a button for performing print instruction of image and/or document data displayed by the browser. The above-described instructions can be performed even from another application installed on the client 100.

Regarding Communication Data

Figure 6:
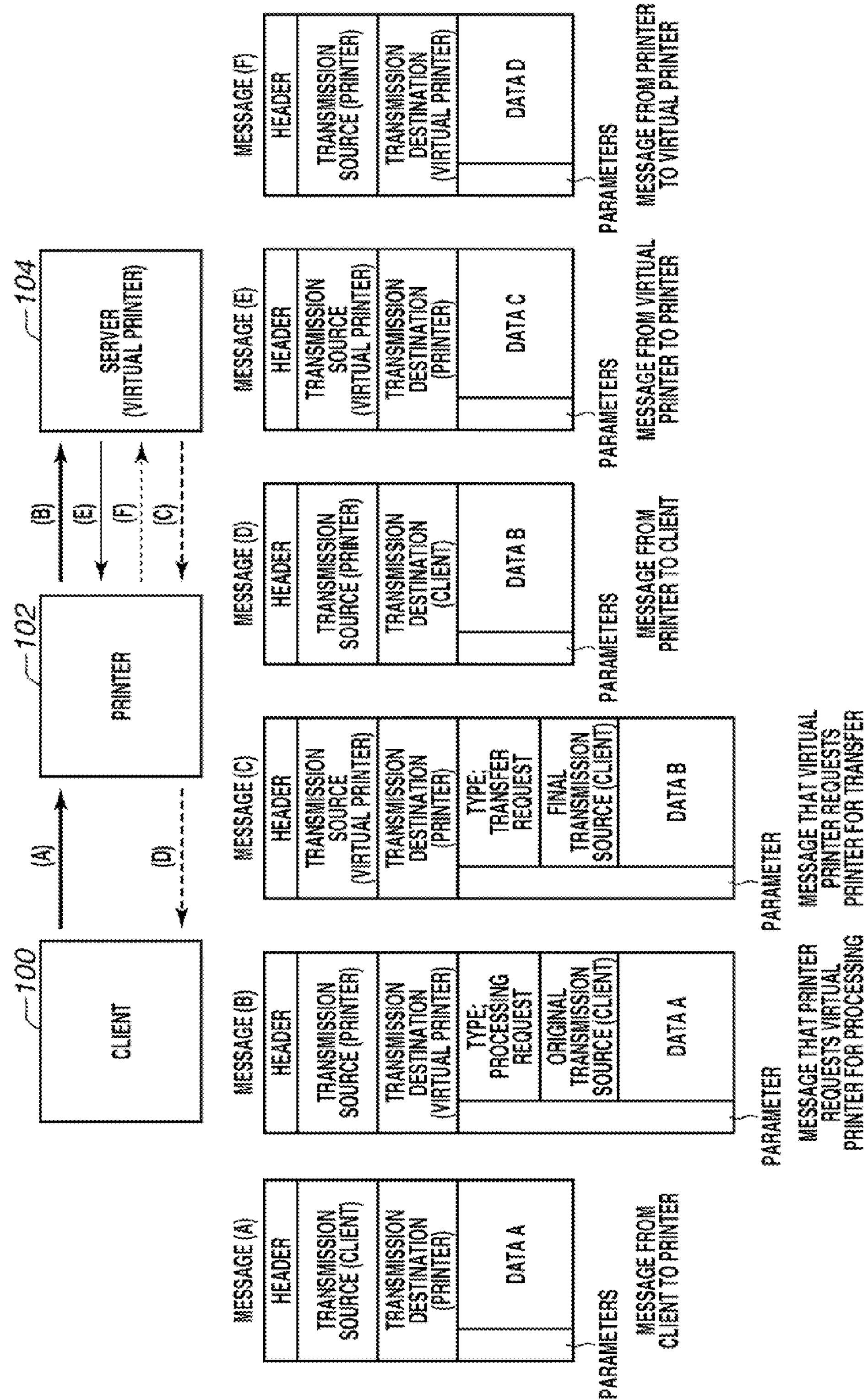
FIG. 6 illustrates contents of request and response messages according to the exemplary embodiment of the present invention.

FIG. 6 illustrates request and response messages which are exchanged among the client 100, the printer 102, and the virtual printer 104. As illustrated in a message (A) to a message (F) in FIG. 6, a basic structure of message includes a header portion in which necessary information such as a size and identification (ID) of the message are described, and a parameter portion. The header portion contains information of a transmission source (i.e., IP address), and information of a transmission destination (i.e., IP address). The parameter portion contains data described in a format corresponding to a network protocol to be utilized. The parameter portion is created by the transmission source of the message. The transmission destination interprets and understands the parameter portion of the message and can execute various types of processing requested from the transmission source.

If only private communications between particular devices are to be performed, specification of the parameters only needs to be agreed on between the particular devices. However, in the situation that client apparatuses equipped with the latest functions are released on a daily basis, it is difficult for the printer 102 to comply with network protocols (to describe in more detail, the parameter portions of request messages) which responds to requests from all of the client apparatuses.

The messages (A) and (D) exchanged between the client 100 and the printer 102 contain the parameter portion (data A) described in accordance with public specification. For example, in the first exemplary embodiment, the vendor of the client 100 determines the public specification. On the other hand, the messages (B), (C), (E), and (F) exchanged between the printer 102 and the virtual printer 104 comply with a private specification agreed on between the printer 102 and the virtual printer 104, so that the printer 102 and the virtual printer 104 each understand contents of the messages. The printer 102 has complied with the network protocol in advance for communicating with the virtual printer 104. This is because, two apparatuses are prepared by the same vendor, and thus they can be made to be compliant with the network protocol in advance.

In the case of the message (B) which is sent from the printer 102 to the virtual printer 104, the virtual printer 104 needs to be able to understand data structure of the parameter portion (that first includes information indicating "type" and "original transmission source", and then indefinite data A). A second parameter corresponds to the parameter portion, "type" and "original transmission source", which the printer 102 creates. A first parameter corresponds to the parameter portion, "data A" which the client 100 creates. The message (B) is formed by adding the first parameter to the second parameter, and is transmitted to the virtual printer 104. In this manner, a first request message (message (A)) is converted into a second request message (message (B)), and the messages are formatted in accordance with different network protocols.

Similarly, in the case of the message (C) which is sent from the virtual printer 104 to the printer 102, the printer 102 needs to be able to understand data structure of the parameter portion (that first includes information indicating "type" and "final transmission destination", and then indefinite data B). The virtual printer 104 performs interpretation based on the message (B) or (F) transmitted from the printer 102, and creates the message (E) or (C). The messages (E) and (C) are commands to the printer 102. For example, the printer 102 may transfer data created by the virtual printer 104 to the client 100, as well as perform processing only within the printer 102. In the case of the message (E), the printer 102 needs to understand the contents of the parameter (e.g., data C) which is the processing result. In the case of the message (F), the virtual printer 104 needs to understand the contents of data D.

Regarding Presence or Absence of Response Message

According to a type of the message, there is a message that the transmission source of the message does not need to detect a processing result at the transmission destination, or conversely, there is a message that the transmission destination needs to reply the processing result to the transmission source of the message in the form of a response message (a reply to the request message). Similarly to the case of the above-described parameters, regarding whether the response message is necessary, agreement (specification) about presence or absence of the response message will be required in order to normally perform communications among devices of a large variety of manufacturers, and respective devices will perform communication in accordance with the agreement (specification).

The printer 102 may not need in some cases to completely understand the contents of the data C as the parameter portion of the message (E). For example, in the case of a request to transfer data to the client 100 (transmission of the response message), it is not always necessary to understand the data itself to be transferred.

Processing Flow of Printer

Figure 8:
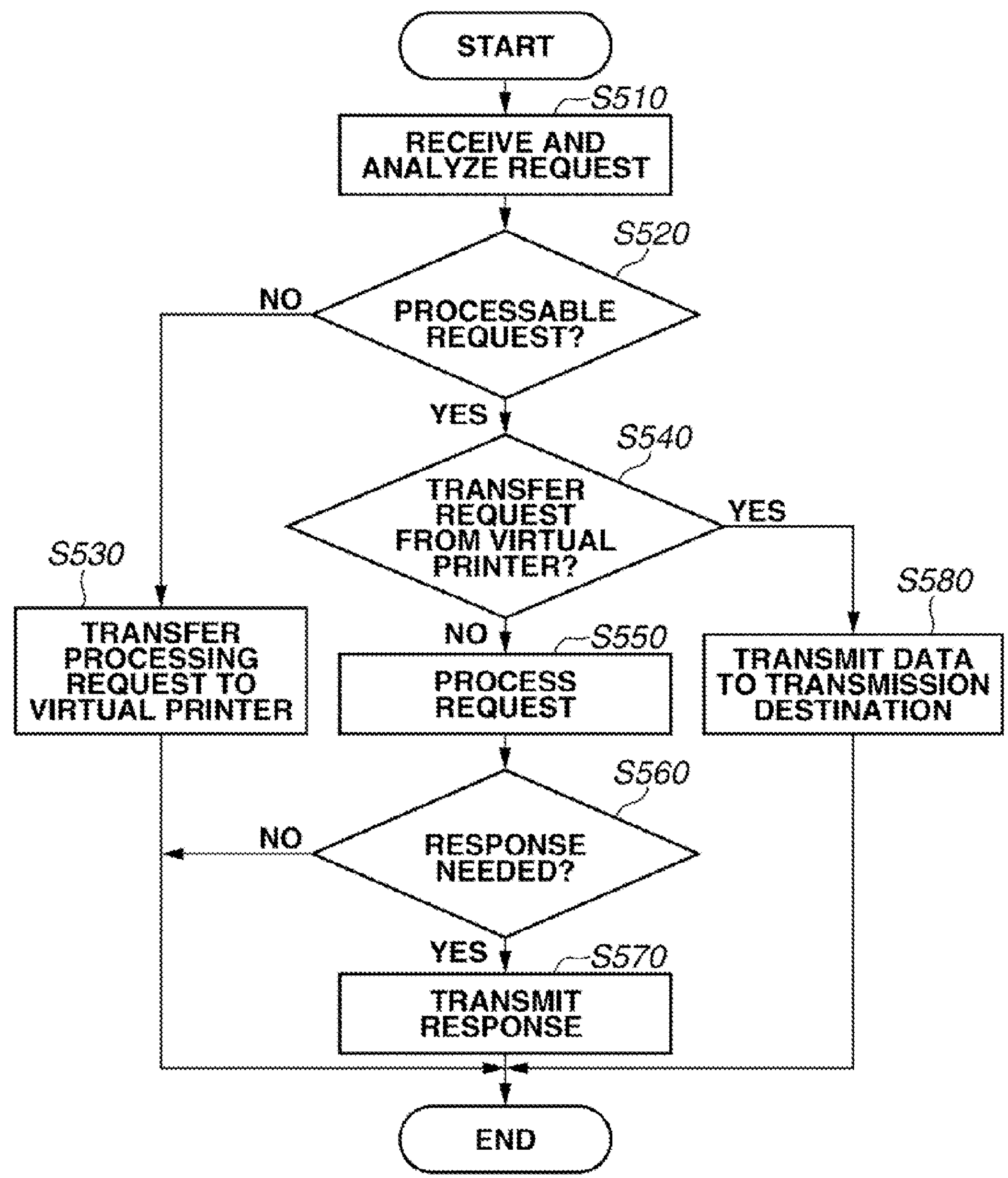
FIG. 8 illustrates a processing flow of the printer.

FIG. 8 is a flowchart illustrating the processing of the printer 102. The processing of the printer 102 will be described with reference to FIG. 8. In step S510, when the printer 102 receives a request from the outside, the input determination unit 222 analyzes a content of the parameter portion of the received request.

In step S520, the input determination unit 222 determines whether the printer 102 can interpret the requested content, that is the content of the request message, or whether the request is processable by the printer 102, when the content can be interpreted. In other words, if a description format of the parameter portion attached to the message is described in a format other than the one which the printer 102 current supports, it means that the content cannot be interpreted by the printer 102.

In this case, if the parameter portion cannot be read (parsed) by applying all description formats of the parameters supported by the printer 102 to the parameter portion of the received message, the input determination unit 222 determines that the requested message cannot be processed by the printer 102. For example, a case where the parameter is compressed in a compression format which is not supported by the printer 102, or a case where the parameter is described in a data structure which is not supported by the printer 102 will fall under this situation. Such situation is referred to as “the printer 102 is not compliant with the protocol”.

Then, a case where data of the parameter portion can be read (parsed) by the input determination unit 222, but the requested function cannot be processed by the printer 102 will be described. For example, this is a case where the printer 102 can understand that portable document file (PDF) direct printing is requested, but the printer 102 does not include a direct printing function of the PDF. Further, a case where the printer 102 can read the parameter described in the extensible markup language (XML) format, but the printer 102 does not support the function described in a namespace in the parameter also falls under this situation. In step S520, if it is determined that the received request is unknown, or known but not processable by the own apparatus (NO in step S520), the process proceeds to step S530. In step S530, the printer 102 creates a processing request and transmits the request to the virtual printer 104.

In step S530, the printer 102 creates the message (B) from the message (A) in FIG. 6, and transmits the message (B). The processing control unit 221 instructs the output creation unit 225 to create the message (B) by setting the type of the parameter portion of the message (B) to “processing request”, and setting an address described in the transmission source of the received message (A) to an original transmission source. The “original transmission source” of the parameter is necessary since it will be used for “final transmission destination” information of the parameter of a transfer request message which will be described below. Further, the processing control unit 211 directly copies the data A which is the parameter portion of the received message (A) on the parameter portion of the message (B) to transmit all contents of the request received by the printer 102 to the virtual printer 104.

The processing request message (B) to the virtual printer 104, which is created as described above, is transmitted via the input/output control unit 210 to an address of the virtual printer 104 stored in the virtual printer address storage unit 201.

If it is determined that the request is interpretable and processable (YES in step S520), then in step S540, the input/output determination unit 222 determines whether the content of the request is a transfer request from the virtual printer. At this time, the input determination unit 222 determines whether a value indicated by the type included in the parameter portion of the message (C) is the “transfer request”.

If the value is not the transfer request (NO in step S540), the process proceeds to step S550, where the processing is performed as normal request. For example, if the content of the request is a request for print processing, the printing instruction unit 223 instructs the printing management unit 230 to execute print processing. If the content of the request is an information provision request, the information collection unit 224 acquires information from the status information management unit 240.

If the processing is performed as the normal request, the processing includes both a case of the instruction from the virtual printer 104 and a case of the instruction from the client 100. To perform the normal request processing according to the instruction from the client 100 means that the printer 102 is compliant with the network protocol which the client 100 utilizes. This normal processing is included in the request processing.

Next, in step S560, the processing is divided according whether the request currently being processed needs a response. Whether the request needs a response is specified by the agreement (specification) and thus it is different from request to request. The input determination unit 221 determines a type of each request.

For example, in a case of processing like the printing request, there is a request which does not need a response depending on the specification of the network protocol. If the response in not needed (NO in step S560), the processing in the printer 102 will end here. The printing request is a request which demands the printer to execute printing, and which does not need to invariably transmit information to the client 100.

On the other hand, in a case of information provision request, the response is needed. If the response is needed (YES in step S560), then in step S570, the output creation unit 225 creates a response corresponding to the request content, and the input/output control unit 210 transmits the created response to the transmission source of the request. However, if it is specified in the network protocol that no response is needed in a case where processing of a request originally requiring a response failed for any reason, there is no need to return the response.

The message (E) in FIG. 6 is a message created if it is determined as NO in step S540. If the response is needed, in step S570, the message (F) is created and transmitted to the virtual printer 104.

In step S540, if it is determined as the transfer request from the virtual printer 104 by the input determination unit 222 (YES in step S540), then in step S580, the processing control unit 221 transfers the content which includes the received parameter to the transfer destination. This transfer processing is included in the request processing.

In step S580, the input/output control unit 210 creates the message (D) from the message (C) in FIG. 6, and performs transmission of the message (D). The type of the parameter of the message (C) is the “transfer request”, and some address is described in the final transfer destination. In addition to the parameter, there is described the data B which is not necessary to be understood by the printer 102. From these information pieces of the received message, the output creation unit 225 creates the message (D) which includes the data B as the parameter. The input/output control unit 210 transmits the message (D) to the client 100, based on the address of the final transmission destination.

The "original transmission source" as the parameter included in the message (B) is used for the "final transmission destination" information of the parameter of the transfer request message. Finally, in order to transmits to the virtual printer 104 all contents of the request which the printer 102 received, the data A of the parameter portion of the received message (A) is copied on the parameter portion of the message (B). Accordingly, both the first parameter and the second parameter will be included in the parameter portion of the message (B).

The processing request message (B) to the virtual printer 104, created in a manner described above, is transmitted to the virtual printer 104 based on the address of the virtual printer 104 stored in the virtual printer address storage unit 201.

Processing Flow of Virtual Printer

Figure 9:
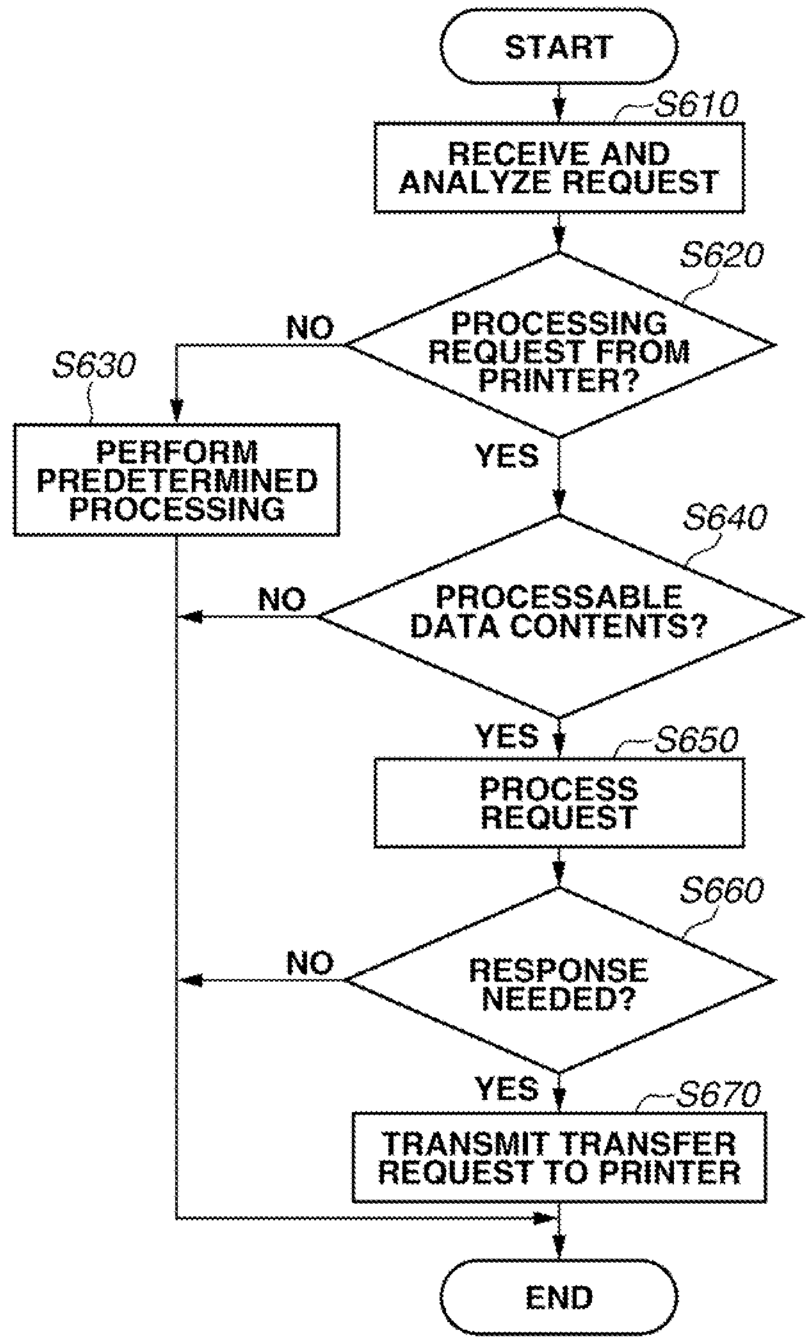
FIG. 9 illustrates a processing flow of the virtual printer.

FIG. 9 is a flowchart illustrating the processing of the virtual printer 104. The processing of the virtual printer 104 will be described with reference to the FIG. 9. In step S610, when the virtual printer 104 receives a request from the outside, the request determination unit 322 analyzes a content of the received request. Next, in step S620, the request determination unit 322 determines whether the content of the request is a processing request from the printer 102.

Whether the content of the request is a processing request from the printer 102 can be determined by checking whether the type parameter in the parameter portion of the message is set to "processing request" by the request determination unit 322. If the content of the request is the "processing request" (YES in step S620), it can be determined as the processing request from the transmission source (the printer).

If the content of the request is not the processing request from the printer (NO in step S620), then in step S630, the virtual printer 104 performs predetermined processing with respect to the request and ends the processing. For example, if the received request is an information provision request to the virtual printer 104, the information collection processing unit 323 collects information of the virtual printer 104 itself, the response creation unit 325 creates a response message, and the response is transmitted to the request source by the transmission unit 330.

If the received request is the processing request from the printer 102 (YES in step S620), then in step S640, the virtual printer 104 interprets the content of the parameter included in the message and determines whether the virtual printer 104 itself can process the request. The request determination unit 322 determines whether the data A included in the parameter portion of the received message is described in a format which can be understood by the virtual printer 104, and the virtual printer 104 can respond to the required function independently or in cooperation with the printer 102.

For example, if the request is the PDF direct printing request, and the virtual printer 104 has a function for converting the PDF format into a data format, which is processable by the printer 102, it is determined as processable. In step S640, if it is determined as not processable (NO in step S640), the process ends.

In this case, the processing requested by the message (A) issued by the client 100 in FIG. 6 will not be executed. If the response message to the message (A) is specified according to the agreement (specification), the response message will not reach the client 100. Therefore, the client 100 can recognize that the printer 102 is not compliant with the issued request message (A).

In step S640, if it is determined as processable (YES in step S640), then in step S650, the virtual printer 104 processes the request. Various types of processing are assumed for the processing of the request. For example, if contents of the received data involve a print instruction to the printer 102, the printing execution instruction unit 324 creates a parameter indicating a printing request to the printer 102, and transmits the parameter of the printing request to the printer 102 by the transmission unit 330. Further, if the contents of the received parameter is a request for acquiring information of the printer 102, the information collection processing unit 323 causes the response creation unit 325 to create the message (E) which includes a parameter for requesting information acquisition, in order to acquire the requested information from the printer 102. Then, the transmission unit 330 transmits the request for acquisition of information to the printer 102.

Next, in step S660, the request determination unit 322 determines whether the request currently being processed needs a response. Whether the request needs a response, similarly to the previous description of the printer 102, is specified with respect to each request, and varies depending on the type of each request. For example, in a case of one-sided request for processing like the printing request, there is a request which does not need a response depending on the agreement (specification). In the case of the request which does not need the response, the virtual printer 104 issues the printing request to the printer 102 in step S650 and ends the processing.

On the other hand, since a response is needed in a case of the information provision request, the response corresponding to the request is created in the response creation unit 325, and the response is returned to the transmission source of the request by the transmission unit 330.

However, if it is specified in the protocol that no response is needed in a case where processing of a request originally requiring a response failed for any reason, and if the processing has actually failed, there is no need to return the response in accordance with the specification. If the response is not needed (NO in step S660), the processing for the request ends. If the response is needed (YES in step S660), the process proceeds to step S670 for creating and transmitting the transfer request to the printer.

In step S670, the message (C) is created from the message (B), and the message (C) is transmitted. The response creation unit 325 sets the type of the parameter of the message to be created to the "transfer request", and sets an address which is described in the original transmission source of the parameter of the message (B) to the final transmission destination. Further, the response creation unit 325 creates the message (C) which includes the previous processing result in step S650, and the data B created by the virtual printer 104 as the parameter, as a response to the data A of the received message.

Description of Processing Outline

Next, how the message (A) to be processed, if the message (A) issued by the client 100 to the printer 102 is not processable by the printer 102, will be described with reference to FIG. 6. Descriptions will be made assuming that the following conditions are satisfied. It is specified by the agreement (specification) of the message (A) that the request message (A) requires the final response message (D). Although the request message (A) is not processable by the printer 102, the virtual printer 104 is configured to be able to process the request message (A). Information concerning the printer 102 is needed for the final response message (D).

Figure 7:
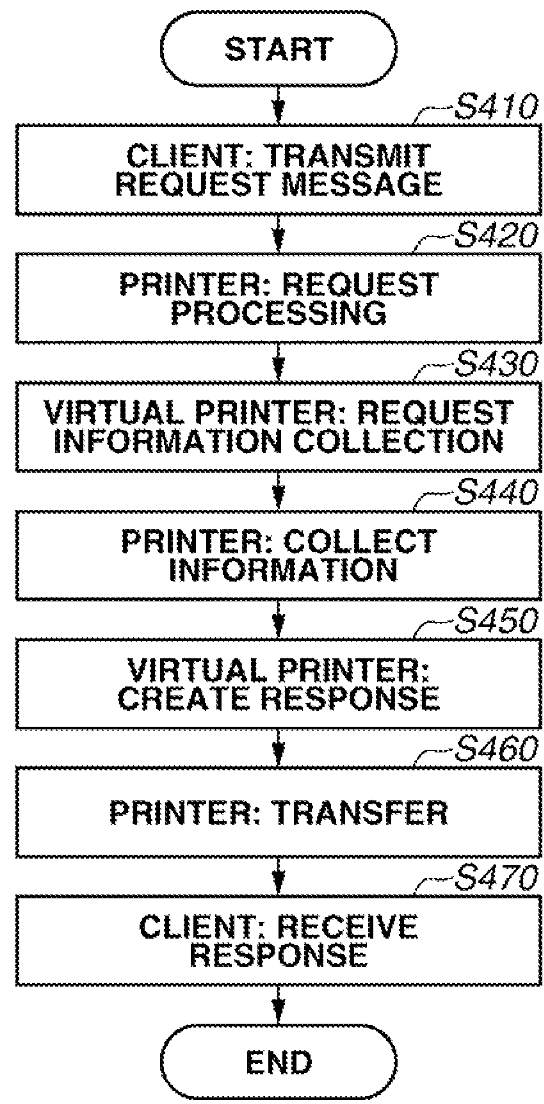
FIG. 7 illustrates a processing flow of an example of implementations of the present invention.

FIG. 7 is a flow illustrating an example of the above-described processing. Descriptions will be made with reference to FIG. 7 and FIG. 6. In step S410, the client 100 transmits the request message (A) to the printer 102.

In step S420, if the printer 102 receives the request message (A), and determines that the data A as the parameter is not processable (NO in step S520 in FIG. 8), the printer 102 creates the message (B) for requesting the virtual printer 104 to perform processing. A creation method of a message is as described in step S530. The printer 102 transmits the message (B) to the virtual printer 104 based on the address stored in advance in the virtual printer address storage unit 201.

In step S430, if the virtual printer 104 receives the message (B), and determines that the type is set to the "processing request" and the data A is processable in step S650 in FIG. 9, the virtual printer 104 performs processing corresponding to the contents of the data A included in the message (B). In this example, since it is assumed that the response message (D) is required, the virtual printer 104 also creates the message (C) for requesting the printer 102 to transfer the response message (D) to the client 100. Since information the information of the printer 102 is required in the data B of the message (C), the virtual printer 104 creates the message (E) for requesting the printer 102 to provide necessary information, and transmits the message (E) to the printer 102.

In step S440, the printer 102 receives the message (E) and checks the contents of the message (E). Since the processing is information provision request, the printer 102 creates the response message (F) including the requested information as the parameter (data D), and transmits it to the virtual printer 104.

In step S450, the virtual printer 104 receives the response message (F), and creates the message (C) by obtaining the data D included therein. The virtual printer 104 creates the message (C) and transmits it to the printer 102, as described in step S670 in FIG. 9.

In step S460, if the printer 102 receives the message (C) and confirms that the type of the parameter portion is the "transfer request", the printer 102 creates the response message (D) including the contents of the data B as the parameter, and transmits it to the client 10 described in the final transmission destination.

Finally, in step S470, the client 100 receives the response (D). In this manner, the client 100 requests the printer 102 to provide the information by the request (A), and the relevant information can be acquired as the response (D). For example, if the request (A) is the information provision request for device search, the client 100 can acquire necessary information by receiving the response (D), and can recognize that the printer 102 has been found.

Processing Example

In order to gain a deeper understanding of the present invention, an operation when the present invention is applied will be described on the assumption of a virtual protocol.

Discovery Function Example

Searches in accordance with Probe/ProbeMatch command which are predetermined by the Web Services Dynamic Discovery (WS-Discovery) specification will be described. Further, a discovery function using acquisition of information in accordance with Get(metadata) predetermined by the WS-Metadata Exchange specification and the WS-Transfer specification will be also described. The WS-Discovery specification is comparable to a protocol for device search.

This example will be described under the following assumptions. The printer 102 is not compliant with the above-described Probe/ProbeMatch and Get(metadata), but it is assumed that the printer 102 can be compliant therewith by being routed via the virtual printer 104. Further, it is assumed that a response ProbeMatch to the Probe can be created only by the virtual printer 104. Furthermore, it is assumed that there is the need, to acquire and respond individual device information and information concerning a printer model from the printer 102, for the response to the Get(metadata). The "individual device information" refers to respective printer-specific values, which include a device ID, a remaining ink amount, a remaining paper amount, and so forth. The "information concerning the printer model" refers to information concerning the model such as model information.

Figure 10:
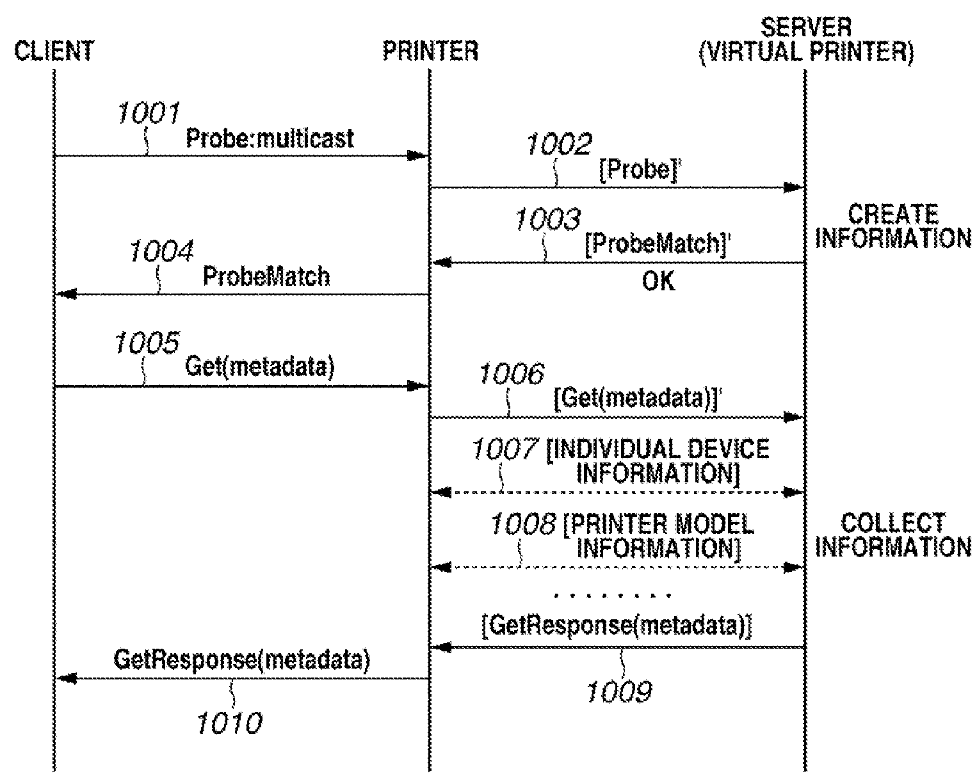
FIG. 10 illustrates an application example of a discovery function of the present invention.

FIG. 10 illustrates the processing among the client, the printer, and the virtual printer when realizing the discovery function. The processing of a discovery search request will be described with reference to FIG. 10. The client 100 transmits a Probe (1001) in multicast to search web services on devices (WSD) compliant devices.

The Probe (1001) is a message sent from the client to a large unspecified number of devices, and the client 100 can recognize that the devices which responded to the message are in conformity to the WS-Discovery specification. The Probe (1001) corresponds to the message (A).

When receiving the Probe (1001), the printer 102 determines that the parameter of the Probe (1001) is not processable by itself, and creates a [Probe]' (1002) from the Probe (1001). Then, the printer 102 transmits the [Probe]' (1002) to the virtual printer 104 as a processing request. At this time, the printer 102 sets the parameter of the Probe (1001) to the parameter portion, writes an address of the virtual printer 104 into the header, and transmits the Probe (1001) via a hypertext transfer protocol (HTTP). The [Probe]' (1002) corresponds to the message (B) in FIG. 6. In the parameter portion of the [Probe]' (1002), the type is set to the "processing request", an address of the client is described in the original transmission source, and the data A included in the Probe (1001) is described as it is.

The virtual printer 104 creates [ProbeMatch]' (1003) which responds to the processing request of the [Probe]' (1002), and transmits it to the printer 102 as the transfer request. The [ProbeMatch]' (1003) corresponds to the message (C). In the parameter portion of the [ProbeMatch]' (1003) includes the parameter which describes that the type is the transfer request, and the final transfer destination is the client 100. In a case in accordance with the WS-Discovery specification, the data B becomes a reply to the Probe.

The printer 102 that received the [ProbeMatch]' (1003) as transfer request, arranges the [ProbeMatch]' (1003) in a format of ProbeMatch (1004), and transmits it to the client 100. In this case, the printer 102 checks an address described in the message C, and only needs to transmit information to be transmitted to the client 100 at a transmission control protocol (TCP) layer level.

Since the printer 102 has replied the ProbeMatch (1004) to the Probe (1001) issued by the client 100 itself, the client 100 will recognize the printer 102 to be a device that is compliant with the WS-Discovery.

If the virtual printer 104 cannot interpret the [Probe]' (1002), in other words, if the virtual printer 104 does not support the protocol, the virtual printer 104 cannot issue the [ProbeMatch]' (1003). Therefore, the printer 102 ceases to return the ProbeMatch (1004) to the client 100.

In this case, since a response to the Probe (1001) issued by the client 100 itself does not return from the printer 102, the client 100 determines that the printer 102 is not compliant with the search in accordance with the Probe/ProbeMatch commands. If the virtual printer returns a response indicating that the Probe (1001) cannot be interpreted, accordingly the printer may return a response indicating that the Probe (1001) is not processable to the client 100.

Next, the client 100 issues a Get(metadata) (1005) to acquire metadata information of the printer 102. Upon receiving the Get(metadata) (1005), the printer 102 regards it as not processable by itself, creates [Get(metadata)]' (1006), and transmits it as a processing request to the virtual printer 104.

The [Get(metadata)]' (1006) corresponds to the message (B) in FIG. 6. In the parameter portion, the type is set to the "processing request", an address of the client is described in the original transmission source, and the data A included in the Get(metadata) (1005) is described as it is.

The virtual printer 104 interprets contents of the [Get (metadata)]' (1006). In this example, it is assumed that the contents includes a request for individual device information (version of firmware, friendly name, and serial number) of the printer 100, and a request for printer model information (category of the device, manufacturer, manufacturer's URL, model name, model number, URL for the model, and presentation uniform resource locator (URL)).

To request the printer 102 for individual device information and the printer model information, requests 1007 and 1008 are issued respectively and information is collected. The virtual printer 104 issues these requests 1007 and 1068 interpretable by the printer 102. The printer 102 that received the requests 1007 and 1008 returns individual device information and the printer model information to the virtual printer 104 as the responses to these requests, respectively.

The request 1007 represents the message (E) and the message (F) in FIG. 6 by a line. An acquisition request of the individual device information is described in the data C of the message (E), and individual printer information is described in the data D of the message (F) as a reply from the printer 102.

In FIG. 10, the request 1007 is illustrated by the line to acquire the individual printer information. However, if the printer 102 responds to only the information request with respect to each of the elements included in the individual printer information (version of firmware, friendly name, and serial number), the printer 102 will perform individually the information provision requests. Regarding the request 1008, the situation thereof is similar to that of the request 1007, except that the individual printer information is replaced with the printer model information, and descriptions thereof will not be repeated.

When acquiring the individual device information and the printer model information, the virtual printer 104 creates [GetResponse(metadata)]' (1009) as a response to the [Get (metadata)]' (1006), and transmits it as the transfer request. The [GetResponse(metadata)]' (1009) corresponds to the message (C) in FIG. 6, and in the parameter portion, it is described that the type is the transfer request and the final transmission destination is the client. The data B contains the individual device information and the printer model information collected in the requests 1007 and 1008 as the response messages to the Get(metadata) (1005), which are described in formats specified by respective specifications.

The printer 102 receives the [GetResponse(metadata)]' (1009), converts it into the form of GetResponse(metadata) (1010), and transmits it to the client 100. In this manner, the client 100 can acquire necessary information from the printer 102, and the discovery function specified in accordance with the WSD can be realized.

Printing Function Example

Next, the WSD print service specification (Print Service Definition Version 1.0 For Web Service on Devices) will be described as an example. An application example to the printing function will be described taking the printing using a CreatePrintJob command and a SendDocument command predetermined by the WSD print service specification as an example. The WSD print service specification corresponds to the print protocol.

In this example, descriptions will be made under the following assumptions. The printer 102 is not compliant with the CreatePrintJob command and the Send Document command, but can be compliant therewith by being routed via the virtual printer 104. Further, in a response to the CreatePrinter command, the printer 102 needs to return information including a job ID as a response if the printer 102 is in printable state. The response is required to the SendDocument command predetermined in the specification. In this case, however, in a sense of describing all systems in the present invention, descriptions will be made assuming that the response is not required to the SendDocument command which is handled in this example. Further, it is assumed that a response to the printing request from the virtual printer 104 to the printer 102 is not needed.

Figure 11:
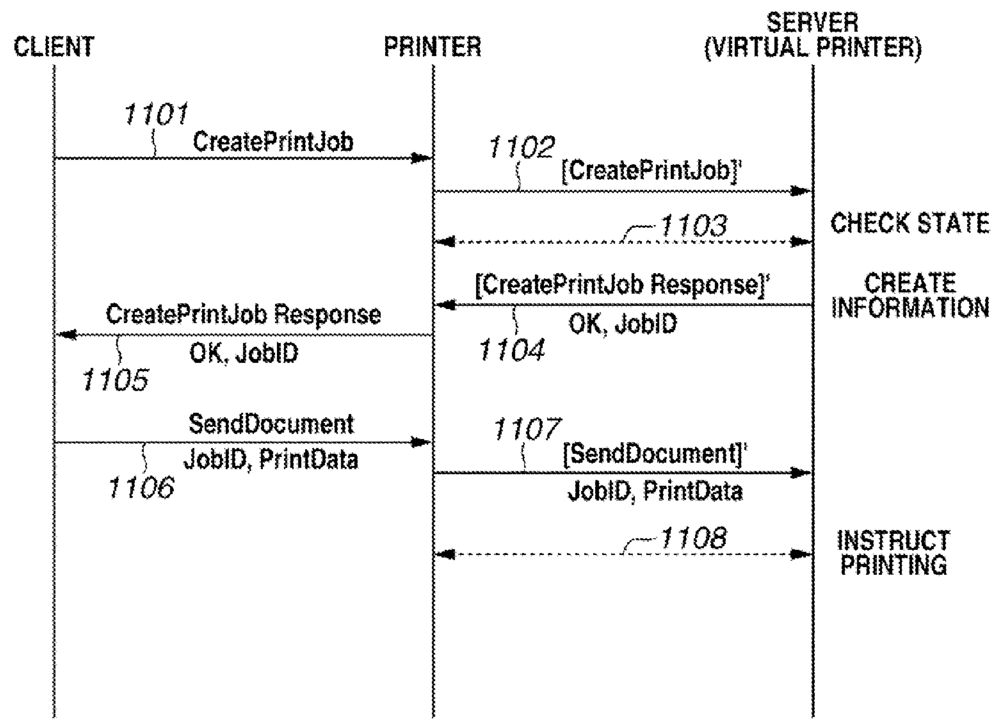
FIG. 11 illustrates an application example of a print function of the present invention.

FIG. 11 illustrates the processing among the client, the printer, and the virtual printer, when realizing the printing function. The processing when realizing the printing function will be described with reference to FIG. 11. The client 100 transmits CreatePrintJob (1101) to the printer 102 in order to prepare for printing. The CreatePrintJob (1101) is issued as a preparation request of the printing processing. If the printer which received the request can perform printing, the printer will reply job ID information.

The printer 102, which received the CreatePrintJob (1101), determines that the request is not processable, creates [CreatePrintJob]' (1102), and transmits it to the virtual printer 104 as the processing request. The [CreatePrintJob]' (1102) corresponds to the message (B) in FIG. 6. In the parameter portion, the type is set to the "processing request", and the address of the client is described in the original transmission source. Further, the data A included in the CreatePrintJob (1101) is described as it is in the message (B).

The virtual printer 104, upon receiving the processing request of the [CreatePrintJob]' (1102), transmits a request 1103 to the printer 102 to check whether the printer 102 is ready to perform printing. In the request 1103, the message (E) and the response message (F) thereto are exchanged. In the data C of the message (E), data indicating a state check request whether the printer 102 is printable is described as the parameter. In the data D of the response message (F), information indicating whether the printer 102 is in the printable state is described as the parameter. If the printer 102 is in the printable state, the printer 102 replies a content indicating the printable state to the state check request 1103 from the virtual printer 104.

The virtual printer 104, upon receiving the reply from the printer 102 that it is in the printable state, creates necessary job ID as the response to the [CreatePrintJob]' (1102). Further, the virtual printer 104 creates [CreatePrintJob Response]' (1104) including the job ID, and transmits it as the transfer request to the printer 102. The [CreatePrintJob]' (1102) corresponds to the message (C), and the parameter portion contains descriptions that the type is the transfer request and the final transfer destination is the client 100. In the message (C), the data B is described in accordance with the WSD print service specification. According to the WSD print service specification, a reply to the CreatePrintJob and job ID will be described in the data B.

The printer 102, upon receiving the [CreatePrintJob Response]' (1104), converts it into the form of CreatePrintJob Response (1105) and transmits it to the client 100.

The client 100 will receive the CreatePrintJob Response (1105) indicating that the printing processing is possible from the printer 102, as the response to the CreatePrintJob (1101). Accordingly, the printer 102 determines that the printing processing in accordance with the WSD print service specification is possible.

If the content of the parameter of the CreatePrintJob Response (1105) is a reply indicating printable, the client 100 transmits to the printer 102 a SendDocument (1106) including the job ID and the printing data acquired in the CreatePrintJob Response (1105). The client 100 specifically requests printing via this message, and at the same time will transmit the print data to the printer 102.

The printer 102, upon receiving the SendDocument (1106), determines the request to be not processable, creates a [SendDocument]' (1107), and transmits the processing request to the virtual printer 104. The [SendDocument]' (1107) corresponds to the message (B), and in the parameter portion, the type is set to the "processing request", and the address of the client is described in the original transmission source. Further, in the message (B), the data A included in the SendDocument (1106) is described as the parameter.

The virtual printer 104, upon receiving the [SendDocument](1107), issues a print instruction (1108) to the printer 102 to perform printing based on the print data added to the instruction. The instruction 1108 corresponds to the message (E), and the data C will include information indicating the printing request and the print data for specifically performing printing. The virtual printer 104 may convert the print data into printing data in page description language (PDL) and transmit it to the printer 102.

In the example, since the response to the SendDocument (1106) is assumed to be unnecessary, the response to the [SendDocument]' (1107) is also unnecessary. In short, the determination in step S660 in FIG. 9 becomes NO. In addition, since the response to the print instruction (1108) is assumed to be unnecessary, the processing on the virtual printer 104 side ends at the point that the print instruction (1108) to the printer 102 is issued.

The printer 102 receives the print instruction (1108) from the virtual printer 104, and performs print processing. In this example, the response to the print instruction (1108) is unnecessary. Therefore, the processing of the printer 102 to the print instruction (1108) ends at the point when the print processing ends. However, if the address of the client 100 is included in the print instruction (1108), the printer 102 transmits a response that the printing is completed to the client 100, after completion of printing.

In this manner, even if the client 100 has issued the print instruction in a format which the printer 102 does not support, the printer 102 can appropriately perform printing. In other words, from a user of the client 100, the printer 102 seems like a device which supports the printing function in accordance with the WSD print service specification.

As another exemplary embodiment, registration of the address of the virtual printer 104 on the virtual printer address storage unit 201 in FIG. 4 will be briefly described.

In the first exemplary embodiment, the address of the virtual printer 104 is assumed to be set in advance in the virtual printer address storage unit 201. For example, by previously setting the address of the virtual printer 104 to be arranged on a global Internet as a setting at time of shipment from the factory, it is possible to provide the functions according to the present invention to the virtual printer 104 if the virtual printer 104 is in environments connectable to the Internet. However, if the setting is remained at the preset state, there may occur a problem with concentration of accesses to a particular virtual printer or a problem that only a uniform new function can be provided in worldwide.

Figure 12A:
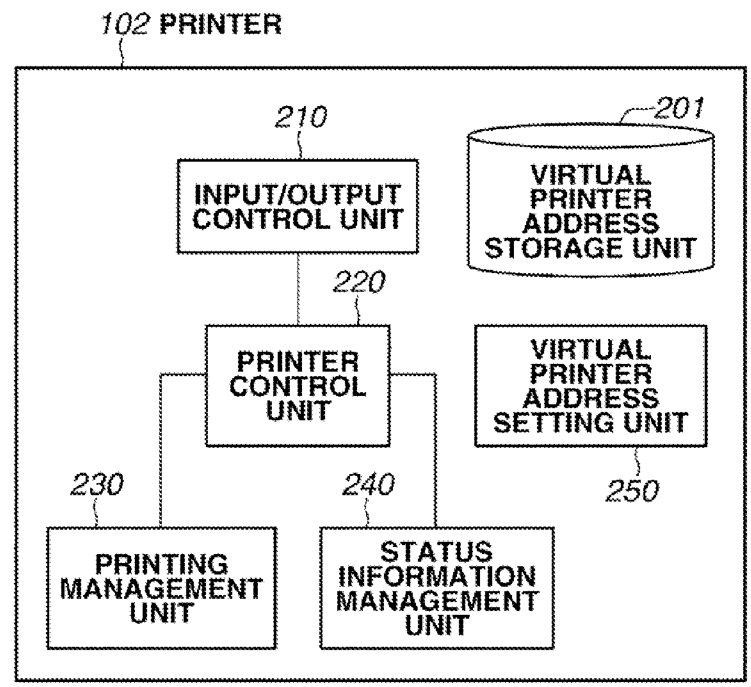
FIG. 12A is a block diagram illustrating a software configuration of the printer according to another exemplary embodiment.

In another exemplary embodiment, an example of setting the virtual printer address storage unit 201 for each printer 102 is described. For example, by establishing the virtual printer 104 which is private in a company, the effects of increasing speed of accesses and being compliant with individual unique protocols can be produced. FIG. 12A is a block diagram illustrating a software configuration of the printer 102 according to the present exemplary embodiment. FIG. 12A illustrates the configuration in which a virtual printer address setting unit 250 is added to the configuration in FIG. 4 described in the first exemplary embodiment.

Figure 12B:
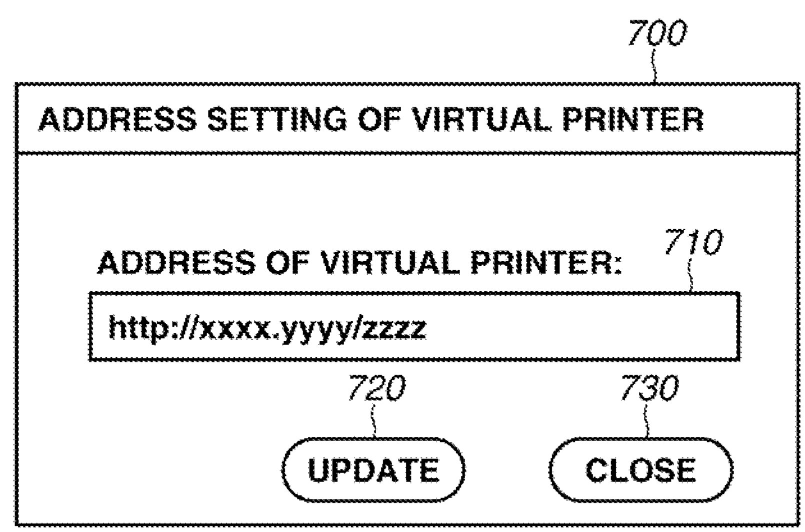
FIG. 12B illustrates an example of a user interface displayed by a virtual printer address setting unit.

FIG. 12B illustrates an example of a user interface (UI) which the virtual printer address setting unit 250 displays on a panel UI (not illustrated). Operation of the virtual printer address setting unit 250 will be described. The virtual printer address setting unit 250 displays the UI like the one in FIG. 12B on the operation panel UI (not illustrated), according to a user instruction via the operation unit 21 in FIG. 2. At the point when the UI is displayed, address information (URL or IP address) which is stored in the virtual printer address storage unit 201 at that time is displayed. If nothing is set up in the virtual printer address storage unit 201, it becomes blank display.

A control 710 is designed to be editable, and the control 710 can be edited in accordance with an instruction from the user via the operation unit 21 in FIG. 2. When an update button 720 is selected by the user, the virtual printer address storage unit 201 rewrites the setting with the information described in the control 710. When a close button 730 is selected, the virtual printer address setting unit 50 ends.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

REFERENCE SIGNS LIST

100 Client
102 Printer
104 Virtual printer

The invention claimed is:

1. An image forming apparatus comprising:

a reception unit configured to receive a first parameter, which is a parameter to be transmitted in response to a user issuing an instruction of a request to the image forming apparatus via a client and is described in a format that conforms to a first network protocol corresponding to the request; and an execution unit configured, in response to the image forming apparatus being compliant with the first network protocol, to interpret the first parameter received by the reception unit and to execute the request processing based on a result of interpretation, and, in response to the image forming apparatus not being compliant with the first network protocol, the execution unit add the first parameter received by the reception unit to a second parameter which is described in a format in accordance with a second network protocol that is different from the first network protocol, and to transmit the second parameter to a server, the execution unit receive a processing result from the server which has interpreted the first parameter based on the second parameter, and to execute the request processing based on the processing result.

2. The image forming apparatus according to claim 1, wherein the request is a request for device search, and the first network protocol is a protocol for the device search, the image forming apparatus further comprising:

a provision unit configured to provide metadata including individual device information and printer model information, in response to a request for the metadata from the server to which the second parameter is transmitted by the execution unit and which has interpreted the first parameter, wherein the execution unit executes the request processing to transmit the metadata to the client based on the metadata provided by the provision unit and the processing result including an address of the client.

3. The image forming apparatus according to claim 1, wherein the request is a request of print from a print function provided by software installed in the client, and the first network protocol is a print protocol corresponding to the print function, wherein the reception unit receives print data in addition to the first parameter, and wherein the execution unit transmits the second parameter and the print data to the server, receives the print data converted based on the processing result from the server which has interpreted the first parameter and the print data, and executes the request processing to print the print data based on the processing result.

4. The image forming apparatus according to claim 3, wherein, in response to printing the print data, the execution unit does not transmit a message of completion of printing to the client in response to the address of the client not being included in the processing result, and the execution unit transmits the message of completion of printing to the client in response to the address of the client being included in the processing result.

5. An image forming apparatus comprising:

a reception unit configured to receive a first request message, which is a request message to be transmitted in response to a user issuing an instruction of a request to the image forming apparatus via a client and is transmitted in accordance with a first network protocol corresponding to the request; and an execution unit configured, in response to the image forming apparatus being compliant with the first network protocol, to interpret the first request message received by the reception unit and to execute request processing based on a result of interpretation, and, in response to the image forming apparatus not being compliant with the first network protocol, the execution unit transmit the request message received by the reception unit to a server in accordance with a second network protocol that is different from the first network protocol, and the execution unit receive a processing result from the server which has interpreted the request message, and to execute the request processing based on the processing result.

6. A method for controlling an image forming apparatus, the method comprising:

receiving a first parameter, which is a parameter to be transmitted in response to a user issuing an instruction of a request to the image forming apparatus via a client and is described in a format that conforms to a first network protocol corresponding to the request; and in response to the image forming apparatus being compliant with the first network protocol, interpreting the received first parameter, and executing request processing based on a result of interpretation, and, in response to the image forming apparatus not being compliant with the first network protocol, adding the received first parameter to a second parameter which is described in a format in accordance with a second network protocol that is different from the first network protocol, transmitting the second parameter to a server, receiving the processing result from the server which has interpreted the first parameter based on the second parameter, and executing request processing based on the processing result.

7. A non-transitory computer-readable storage medium storing a program causing an image forming to execute the method according to claim 6.

* * * * *